United States Patent [19]
Caputo

[11] 3,821,628
[45] June 28, 1974

[54] ELEVATOR SYSTEM
[75] Inventor: William R. Caputo, Wyckoff, N.J.
[73] Assignee: Westinghouse Electric Corporation, Pittsburgh, Pa.
[22] Filed: May 21, 1973
[21] Appl. No.: 362,139

[52] U.S. Cl............... 321/9 R, 318/345, 321/10, 321/27 R
[51] Int. Cl. ........................................ H02m 1/12
[58] Field of Search............ 318/345; 321/9, 10, 27, 321/45 R

[56] References Cited
UNITED STATES PATENTS

| | | | |
|---|---|---|---|
| 2,035,457 | 3/1936 | Blumlein | 321/10 X |
| 3,418,560 | 12/1968 | Peterson | 321/47 |
| 3,510,753 | 5/1970 | Lawn | 321/10 X |
| 3,541,425 | 11/1970 | Weidmann | 321/10 X |
| 3,564,371 | 2/1971 | Schonholzer | 318/345 |
| 3,713,011 | 1/1973 | Johnson | 321/27 R |
| 3,713,012 | 1/1973 | Johnson | 321/27 R |

Primary Examiner—William M. Shoop, Jr.
Attorney, Agent, or Firm—D. R. Lackey

[57] ABSTRACT

An elevator system including an elevator car mounted for movement in a guided path, and means including static converter apparatus connected to a source of alternating potential and to a direct current motor, for driving the elevator car in its guided path. The static converter apparatus includes an electrical filter on the direct current side thereof for reducing the magnitude of the ripple component in the direct current voltage applied to the direct current motor, to reduce the operating sound level thereof.

6 Claims, 2 Drawing Figures

PATENTED JUN 28 1974

3,821,628

ELEVATOR SYSTEM

BACKGROUND OF THE INVENTION

1. Field of the Invention

The invention relates in general to elevator systems, and more specifically to elevator systems in which the drive includes static converter apparatus.

2. Description of the Prior Art

Elevator systems of the traction type, in which the drive sheave is driven by a direct current motor, conventionally develop the direct current voltage for the drive motor with a motor-generator set. The motor generator set, however, is being increasingly replaced by static converter apparatus which develops the direct current voltage for the drive motor directly from an alternating current source via solid state switching devices. For example, U.S. Pat. Nos. 3,713,011 and 3,713,012 disclose dual converters which are suitable for use with elevator systems, and my copending application Ser. No. 256,318, now U.S. Pat. No. 3,749,204 discloses an elevator system which utilizes static converter apparatus for developing the direct current voltage for a direct current elevator drive motor.

The static converter source of direct current voltage for elevator drive machines develops the direct current directly from the alternating current source, and thus does not have the isolation between the alternating and direct current circuits that the motor-generator supply has. My hereinbefore-mentioned U.S. patent is directed to providing a new and improve stabilizing signal for the elevator control which does not require a metallic connection between the control circuit and the armature circuit of the direct current drive motor.

The drive motor, when connected to a static converter source of direct current voltage develops a much higher acoustic or sound level than when the same motor is connected to a motor-generator source of direct current voltage. Elevator systems are installed in office buildings, apartment buildings, hospitals, and the like, all of which demand that the elevator system not produce a sound level which would be objectional to workers, tenants, and/or patients in the building. A conventional approach to reducing the magnitude of an objectionable sound level produced by energized electrical apparatus would be to mount the drive machine on sound absorbing mounts or pads. Certain types of elevator drive machines, however, do not have beds which lend themselves to efficient padding, and the padding of elevator drive machines of the type which do lend themselves to padding did not entirely solve the noise problem. While padding reduces the magnitude of structure borne noise, it does nothing to reduce air borne noise, which is amplified in an elevator system due to the column of air in the shaftway over which the drive machine is mounted.

SUMMARY OF THE INVENTION

Briefly, the present invention is a new and improved elevator system having a static converter source for the direct current elevator drive machine. An electrical filter is connected between the static converter, on the direct current side thereof, and the direct current drive motor, with the filter being tuned to reduce the magnitude of the alternating or ripple component in the direct current output voltage of the static converter before it is applied to the direct current motor.

It is important that the electrical filter reduce acoustic noise sufficiently at all levels of operating current, and it should do so without degrading the system performance or dissipating excessive power. Further, it should not comprise the stability of the control loop.

An electrical filter which meets these criteria includes a reactor connected in series with the output of the converter bank and the armature of the direct current drive motor, and a capacitor and resistor serially connected across the armature of the direct current drive motor. The filter is tuned to a frequency which is low enough to achieve good attenuation of the ripple component at all levels of current, but high enough to prevent stability problems. When the converter is a three-phase full-wave bridge, the fundamental ripple frequency is 360 hz., and a good range for the tuned frequency of the filter has been found to be about 100 – 180 hz.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF PREFERRED EMBODIMENTS

Figure 1:
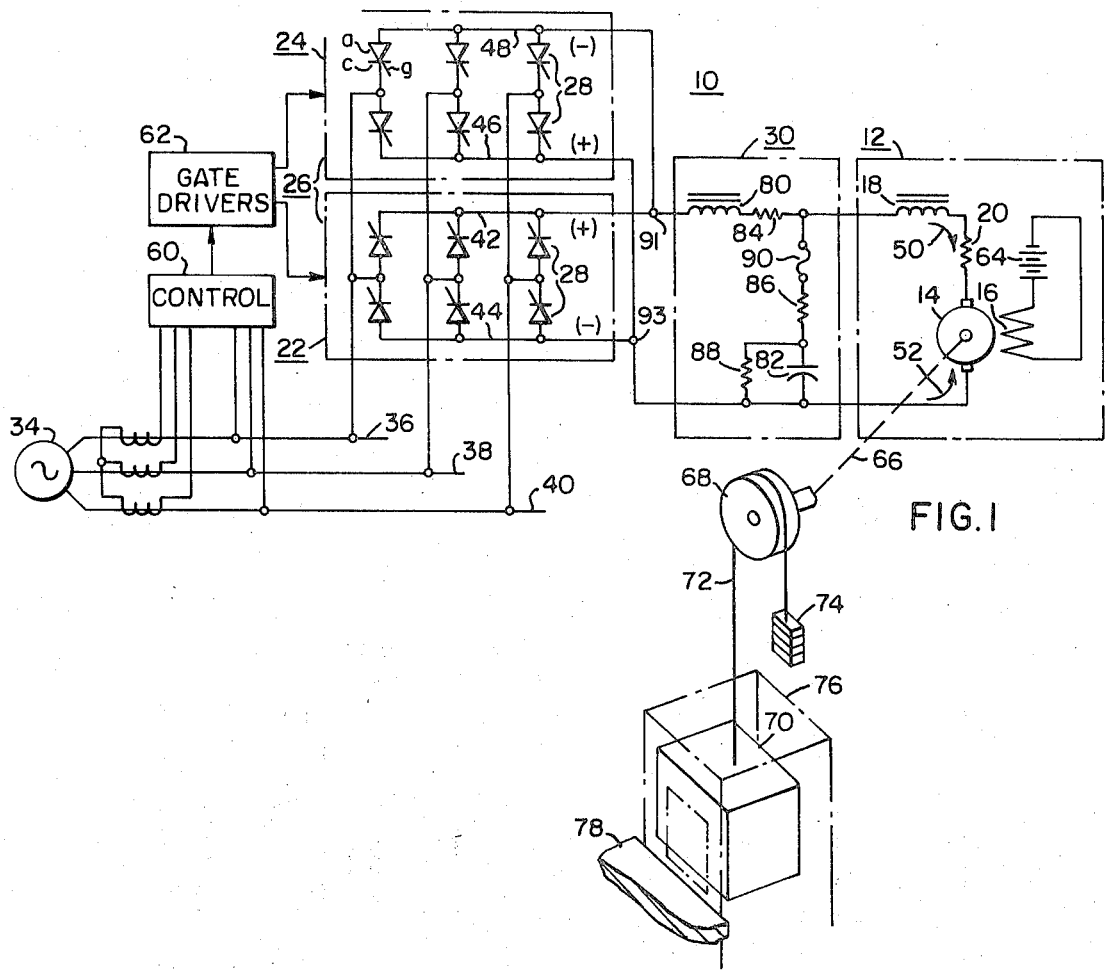
FIG. 1 is a schematic diagram of an elevator system which utilizes the teachings of the invention.

Referring now to the drawings, and FIG. 1 in particular, there is shown an elevator system 10 of the electric traction type, which includes a direct current drive motor 12 having an armature 14 and a field winding 16. The armature 14 includes a certain amount of inductance and resistance, with these inherent qualities indicated as lumped inductance and resistance at 18 and 20, respectively.

The armature 14 of the elevator drive motor 12 is electrically connected to an adjustable, static source of direct current potential, which source includes first and second converter banks 22 and 24, respectively, referred to collectively as a dual converter 26. Each of the converter banks 22 and 24 of the dual converter 26 may be a three-phase, full-wave bridge circuit, which includes a plurality of controlled rectifiers or thyristors 28, each having anode, cathode, and gate electrodes a, c, and g, respectively, connected to interchange electrical power between alternating and direct current circuits. The alternating current circuit includes a source 34 of alternating potential, such as a three-phase, 60 hz. supply, and electrical busses 36, 38 and 40. The direct current circuit includes busses 42 and 44 to which the first converter bank 22 is connected, busses 46 and 48 to which the second converter bank 24 is connected, and output terminals 91 and 93. Busses 42 and 48 are connected to output terminal 91, and busses 44 and 46 are connected to output terminal 93.

The two converter banks 22 and 24 are conventionally connected in parallel opposition with their direct current output circuits being directly connected to the armature 14 of the drive motor 12. According to the teachings of the invention, however, output terminals 91 and 93 of the dual converter 26 are connected to the drive motor 12 via an electrical filter circuit 30.

The dual bridge converter 26 controls the magnitude of the direct current voltage applied to armature 14, by controlling the conduction or firing angle of the controlled rectifier devices, and it controls the direction of the direct current flow through the armature 14 by selectively operating the converter banks. The two converter banks are never operated simultaneously, as this would create a short-circuit condition.

When converter bank 22 is operational, current flow is indicated by arrow 50, proceeding through the armature 14 from output terminal 91 to output terminal 93. When converter bank 24 is operational, current flow is indicated by arrow 52, proceeding from output terminal 93 to output terminal 91. Thus, the direction of torque in armature 14 depends upon which of the two converter banks is operational, and the speed of rotation of the drive motor depends upon the firing angle of the controlled rectifiers. Since my hereinbefore-mentioned co-pending application illustrates a typical servo control loop, and the hereinbefore-mentioned U.S. patents illustrate dual converter apparatus suitable for an elevator application, all of which are assigned to the same assignee of the present application, these patents, and the application, are incorporated by reference, and it is sufficient to indicate the control generally at 60, and the gate drivers, which are responsive to the control 60, at 62.

The field winding 16 of the drive motor 12 is connected to a source 64 of direct current voltage, represented by a battery in FIG. 1, but any suitable source, such as a single converter bank, may be used.

The drive motor 12 includes a drive shaft 66, to which a traction sheave 68 is secured. An elevator car 70 is supported by a rope 72 which is reeved over the sheave 68 and connected to a counterweight 74. The elevator car 70 is disposed in a hoistway 76 for guided movement therein to serve a plurality of floors, such as floor 78.

The dual converter 26 has many advantages over the motor-generator set in providing an adjustable direct current voltage for the elevator drive machine, but it is important that the operating noise level of the drive machine be reduced to within an acceptable limit. Padding the machine, when the machine design is such that it lends itself to padding, reduces structure borne noise, but the air borne noise level is still objectionable. Further, any means employed for reducing the acoustic noise level must be effective at all levels of operating current, it should not deleteriously affect the efficiency or degrade performance of the system, and the stability of the system should not be compromised.

The present invention solves the acoustic noise problem of the drive machine without padding, by providing an electrical filter for the dual converter which filter reduces the magnitude of the ripple component in the direct current voltage, which in turn reduces the acoustic noise developed in the drive machine.

A series tuned inductor is not a suitable filter, as it is too selective. The switching of a static converter between alternating current supply lines provides an alternating component rich in harmonics, especially at zero volts D.C. The harmonics all produce acoustic noise, with the noise level due to a harmonic being a function of the inductance of the motor and the amplitude and frequency of the harmonic.

An inductor alone is not suitable, as it provides very little attenuation of the alternating voltage in the direct current voltage applied to the drive motor and very little attenuation in the sound level.

An inductor and capacitor connected as a L-C filter is highly resonant, producing stability problems.

A filter arrangement which was found to produce excellent results at all levels of current and at the fundamental and harmonic frequencies thereof, is shown in FIG. 1.

Filter 30 includes an inductor or reactor 80, a capacitor 82, resistors 86 and 88, and a fuse 90. Reactor 80, with its inherent resistance being indicated by resistor 84, is connected to output terminal 91 of the dual converter 26, and to the direct current drive motor 12, in series with the armature 14 thereof. Capacitor 82, resistor 86 and fuse 90 are serially connected in shunt with the armature 14 of the drive motor 12. Resistor 88 is a bleeder resistor, connected to shunt capacitor 82 and to discharge capacitor 82 in the event fuse 90 should open the shunt circuit.

Figure 2:
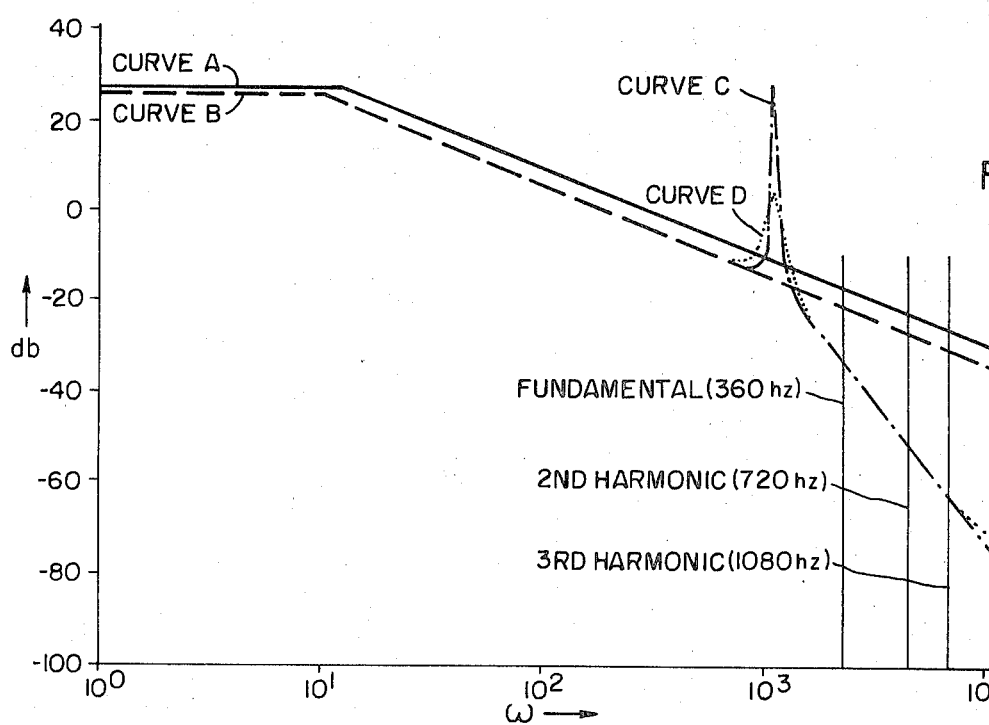
FIG. 2 is a graph which plots attenuation versus frequency for different filter configurations.

The effectiveness of the filter 30 is demonstrated by a series of tests performed while supplying an elevator drive motor from a static converter bank, which, as illustrated in FIG. 1, includes a three-phase, full-wave bridge circuit connected to a 60 hz. source of alternating potential. The direct current drive motor used in the test had an inductance of 0.0032 henry and resistance of 0.042 ohm. Table I tabulates the results of four tests, one of which was made without filter 30, one of which was made with the specific construction for filter 30 shown in FIG. 1, and two of which were made without certain components of filter 30. FIG. 2 is a graph which plots the sound attenuation in db versus frequency in radians per second for each of the tests.

TABLE I

| | D.C. MOTOR 12 | | FILTER 30 | | | | ATTENUATION (db.) | | |
| | | | REACTOR 80 | | | | | | |
| | INDUCTANCE | RESISTANCE | INDUCTANCE | RESISTANCE | CAPACITOR 82 | RESISTOR 86 | 360 HZ | 720 HZ | 1080 HZ |
|---|---|---|---|---|---|---|---|---|---|
| CURVE A | 0.0032 HEN. | 0.042 OHM | — | — | — | — | REFERENCE | REFERENCE | REFERENCE |
| CURVE B | 0.0032 HEN. | 0.042 OHM | 0.0023 HEN. | 0.01 OHM | — | — | 5 | 5 | 5 |
| CURVE C | 0.0032 HEN. | 0.042 OHM | 0.0023 HEN. | 0.01 OHM | 0.0006 FARAD | — | 17 | 19 | 36 |
| CURVE D | 0.0032 HEN. | 0.042 OHM | 0.0023 HEN. | 0.01 OHM | 0.0006 FARAD | 0.2 OHM | 17 | 19 | 36 |

Curve A, shown in FIG. 2 with a solid line, plots the attenuation of acoustic noise versus frequency when the electrical filter 30 is not used. Curve A thus sets the reference level, for comparison with the other tests.

The first test following the reference level test adds the inductor 80 with its inherent resistance 84 between output terminal 91 and the armature 14 of the direct current drive motor 12. The inductor or reactor 80 selected had a value of 0.0023 henry, and the inherent resistance 84 had a value of 0.01 ohm. Curve B, shown as a dashed line curve, plots the attenuation versus frequency for this test, and it will be observed that the reactor 80 had very little affect on the acoustic noise level of the drive motor, reducing it by only 5 db at all frequencies.

The next test added capacitor 82 in shunt with the armature 14. Capacitor 82 had a value of 0.0006 farad. Curve C, shown as a dot-dash curve in FIG. 2, plots the attenuation versus frequency for this test. It will be noted that the attenuation is very good at the fundamental frequency 360 hz., and at the second and third harmonics 720 hz. and 1,080 hz., being 17, 19 and 36 db, respectively. However, it will also be noted that the circuit is lightly damped, resonating at 180 hz., the tuned frequency of the filter 30.

The last test introduced resistor 86 in series with the capacitor 82, with resistor 86 having a value of 0.2 ohm. Curve D, a dotted curve, plots the attenuation versus frequency of this test. It will be noted that the filter still has the excellent attenuation of the fundamental frequency and harmonics thereof that the filter of curve C exhibited, and it will also be noted that the resonance at 180 hz. has been substantially reduced.

It is important that the filter 30 be tuned below the fundamental frequency of the alternating component, which in this example is 360 hz., and that it be tuned as far below this frequency as possible without introducing instability problems. In the example, the damped low-pass L-C filter 30 was tuned to 180 hz., but the tuned frequency may vary somewhat from this value, such as in the range of 100 to 180 hertz.

It is also important to include the fuse 90 to protect capacitor 82 in the event of a failure in the reactor 80, such as a shorted turn, which failure would cause the ripple current to become excessive. A failure in reactor 80 resulting in increased current flow through capacitor 82 will blow the fuse 90. Loss of the fuse 90 will be noted by increased acoustic noise in the drive motor 12.

In summary, there has been disclosed a new and improved elevator system which includes a direct current drive motor and a static converter adjustable source of direct current voltage for the drive motor. Acoustic noise in the drive motor is reduced without padding, and without introducing instability into the control loop, by providing a damped low-pass L-C filter between the dual converter and the armature of the drive motor, which filter is tuned to a frequency below the fundamental frequency of the alternating voltage component in the direct current voltage supplied by the static converter.

I claim as my invention:

1. An elevator system, comprising:
   an elevator car mounted for movement in a guided path, means including a direct current motor having an armature, for driving said elevator car in its guided path,
   a static converter for providing a direct current voltage for the armature of said direct current drive motor,
   said static converter including an alternating current circuit, a first direct current circuit connected to said alternating current circuit, said first direct current circuit providing a direct current output voltage having a ripple component therein, and a low-pass damped L-C filter circuit interconnecting said first direct current circuit and the armature of said direct current motor to provide a direct current through the armature in a first direction, said filter circuit being tuned to a frequency less than the fundamental frequency of the ripple component to reduce the operating sound level of the direct current motor.

2. The elevator system of claim 1 wherein the filter circuit includes inductance means connected between the first direct current circuit and the armature of the direct current motor, and resistance and capacitance means serially connected across the armature of the direct current motor.

3. The elevator system of claim 2 wherein the filter circuit includes a fuse connected in series with the capacitance means.

4. The elevator system of claim 3 wherein the filter circuit includes means connected to discharge the capacitance means when the fuse opens the circuit which includes the capacitance means.

5. The elevator system of claim 1 wherein the ripple component has a frequency of 360 hertz and the damped low-pass L-C filter is tuned to a frequency in the range of about 100 to 180 hertz.

6. The elevator system of claim 1 including a second direct current circuit connected in anti-parallel with the first direct current circuit, said second direct current circuit providing a direct current output voltage having a ripple component therein, said second direct current circuit providing a direct current through the armature in a direction opposite to the first direction, said filter circuit reducing the magnitude of the ripple component applied to the armature of the direct current motor by said second direct current circuit, and means selectively operating said first and second direct current circuits.

* * * * *

Dedication 3,821,628.—*William R. Caputo*, Wyckoff, N.J. ELEVATOR SYSTEM. Patent dated June 28, 1974. Dedication filed Nov. 14, 1977, by the assignee, *Westinghouse Electric Corporation.*

Hereby dedicates to the Public the entire term of said patent.

[*Official Gazette March 7, 1978.*]